US012494590B2

(12) United States Patent
Lee et al.

(10) Patent No.: US 12,494,590 B2
(45) Date of Patent: Dec. 9, 2025

(54) ANTENNA ARRAY

(71) Applicant: Quanta Computer Inc., Taoyuan (TW)

(72) Inventors: Chi-Hsuan Lee, Taoyuan (TW); Tsung-Ying Hsieh, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 195 days.

(21) Appl. No.: 18/405,127

(22) Filed: Jan. 5, 2024

(65) Prior Publication Data

US 2025/0149803 A1 May 8, 2025

(30) Foreign Application Priority Data

Nov. 2, 2023 (TW) ................................ 112142201

(51) Int. Cl.
*H01Q 21/06* (2006.01)
*H01Q 1/48* (2006.01)
*H01Q 21/00* (2006.01)

(52) U.S. Cl.
CPC ............ *H01Q 21/065* (2013.01); *H01Q 1/48* (2013.01); *H01Q 21/0006* (2013.01)

(58) Field of Classification Search
CPC .. H01Q 21/0006; H01Q 21/065; H01Q 1/243; H01Q 1/48
See application file for complete search history.

(56) References Cited

U.S. PATENT DOCUMENTS 6,388,621 B1 * 5/2002 Lynch .................. H01Q 21/065
343/770
11,165,155 B2 11/2021 Huh
2018/0226713 A1 * 8/2018 Lerner ..................... H01Q 1/38
2023/0288529 A1 * 9/2023 Raz ......................... G01S 13/02

FOREIGN PATENT DOCUMENTS

CN 104124517 A 10/2014
CN 106486785 A 3/2017
CN 111033893 A 4/2020
CN 113555678 A 10/2021
TW 201101586 A 1/2011
TW M491965 U 12/2014

OTHER PUBLICATIONS

Chinese language office action dated Apr. 16, 2025, issued in application No. TW 112142201.
Chinese language office action dated Dec. 19, 2024, issued in application No. TW 112142201.

* cited by examiner

*Primary Examiner* — Daniel Munoz
(74) *Attorney, Agent, or Firm* — McClure, Qualey & Rodack, LLP

(57) ABSTRACT

An antenna array includes a glass plate, a ground element, a first radiation element, a second radiation element, a third radiation element, a fourth radiation element, and a feeding network. The glass plate has a first surface and a second surface which are opposite to each other. The ground element is disposed on the second surface of the glass plate. The feeding network has a feeding port. The feeding network is coupled to the first radiation element, the second radiation element, the third radiation element, and the fourth radiation element. The first radiation element, the second radiation element, the third radiation element, the fourth radiation element, and the feeding network are disposed on the first surface of the glass plate.

8 Claims, 5 Drawing Sheets

ANTENNA ARRAY

CROSS REFERENCE TO RELATED APPLICATIONS

This application claims priority of Taiwan Patent Application No. 112142201 filed on Nov. 2, 2023, the entirety of which is incorporated by reference herein.

BACKGROUND OF THE INVENTION

Field of the Invention

The disclosure generally relates to an antenna array, and more particularly, to an antenna array integrated with a mobile device.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements in the field of wireless communication. However, since there is usually limited internal space in mobile devices, it cannot accommodate antennas with relatively large sizes. Accordingly, there is a need to propose a novel solution for overcoming the problems of the prior art.

BRIEF SUMMARY OF THE INVENTION

In an exemplary embodiment, the invention is directed to an antenna array that includes a glass plate, a ground element, a first radiation element, a second radiation element, a third radiation element, a fourth radiation element, and a feeding network. The glass plate has a first surface and a second surface which are opposite to each other. The ground element is disposed on the second surface of the glass plate. The feeding network has a feeding port. The feeding network is coupled to the first radiation element, the second radiation element, the third radiation element, and the fourth radiation element. The first radiation element, the second radiation element, the third radiation element, the fourth radiation element, and the feeding network are disposed on the first surface of the glass plate.

In some embodiments, each of the ground element, the first radiation element, the second radiation element, the third radiation element, the fourth radiation element, and the feeding network is implemented with a transparent element. The transparent element includes a metal mesh layer, a transparent resin layer, and a transparent film layer.

In some embodiments, the antenna array covers an operational frequency band. The operational frequency band is from 10 GHz to 40 GHz.

In some embodiments, the width of each of the first radiation element, the second radiation element, the third radiation element, and the fourth radiation element is substantially equal to 0.5 wavelength of the operational frequency band.

In some embodiments, the center-to-center distance between any two adjacent radiation elements of the first radiation element, the second radiation element, the third radiation element, and the fourth radiation element is from 0.5 to 1 wavelength of the operational frequency band.

In another exemplary embodiment, the invention is directed to an antenna array that includes a glass plate, a grounding radiation element, and a feeding network. The glass plate has a first surface and a second surface which are opposite to each other. The grounding radiation element is disposed on the first surface of the glass plate. A first slot, a second slot, a third slot, and a fourth slot are formed in the grounding radiation element. The feeding network has a feeding port. The feeding network is adjacent to the first slot, the second slot, the third slot, and the fourth slot. The feeding network is disposed on the second surface of the glass plate.

In some embodiments, each of the grounding radiation element and the feeding network is implemented with a transparent element. The transparent element includes a metal mesh layer, a transparent resin layer, and a transparent film layer.

In some embodiments, the length of each of the first slot, the second slot, the third slot, and the fourth slot is substantially equal to 0.5 wavelength of the operational frequency band.

In some embodiments, the center-to-center distance between any two adjacent slots of the first slot, the second slot, the third slot, and the fourth slot is from 0.5 to 1 wavelength of the operational frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
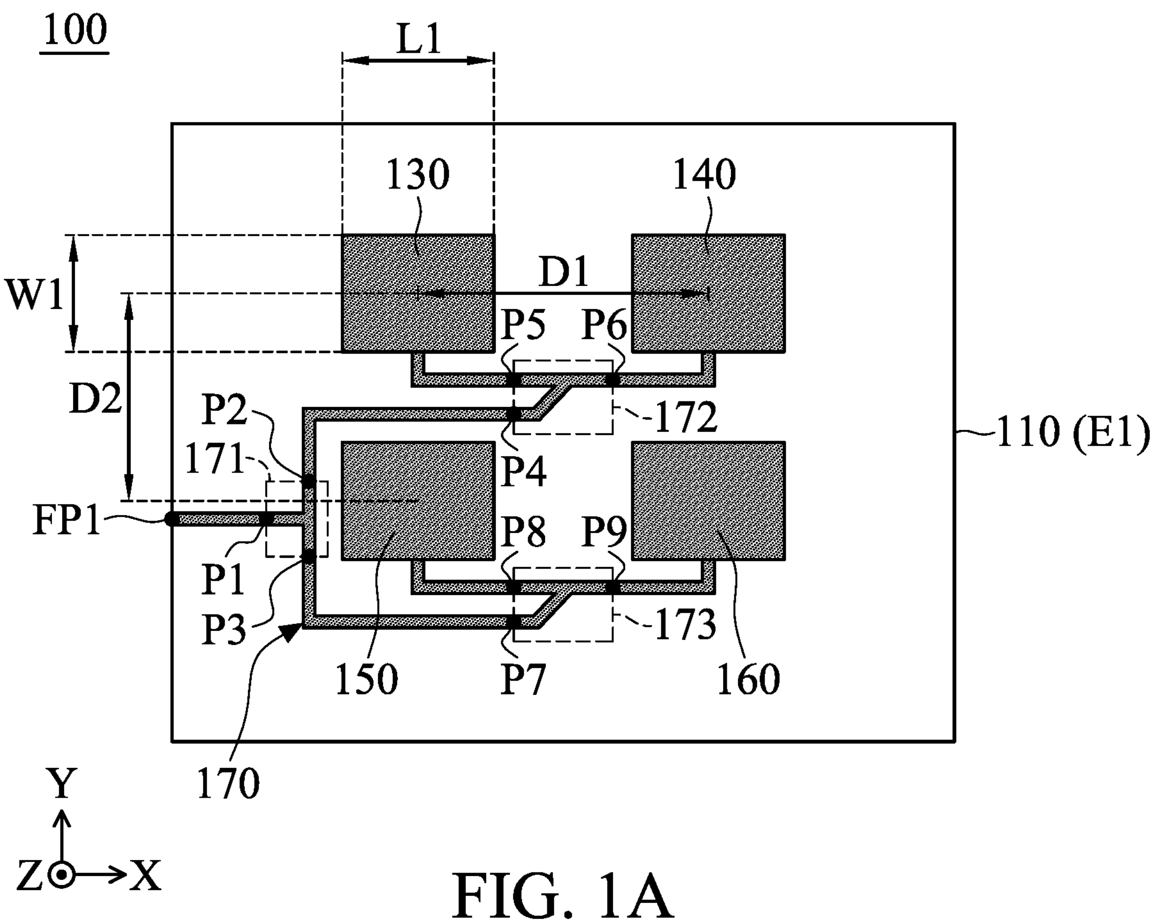
FIG. 1A is a top view of an antenna array according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
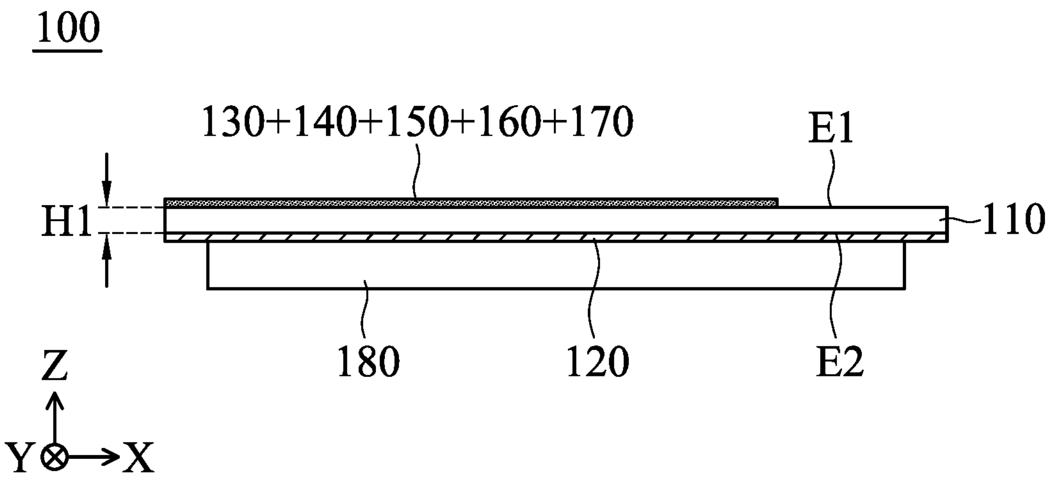
FIG. 1B is a side view of an antenna array according to an embodiment of the invention.

FIG. 1A is a top view of an antenna array 100 according to an embodiment of the invention. FIG. 1B is a side view of the antenna array 100 according to an embodiment of the invention. Please refer to FIG. 1A and FIG. 1B together. The antenna array 100 may be applied in a mobile device, such as a smartphone, a tablet computer, a notebook computer, a wireless access point, a router, or any device with a communication function. Alternatively, the antenna array 100 may be applied to an electronic device, such as any unit of an IOT (Internet of Things).

In the embodiment of FIG. 1A and FIG. 1B, the antenna array 100 at least includes a glass plate 110, a ground element 120, a first radiation element 130, a second radiation element 140, a third radiation element 150, a fourth radiation element 160, and a feeding network 170. The ground element 120, the first radiation element 130, the second radiation element 140, the third radiation element 150, the fourth radiation element 160, and the feeding network 170 may all be made of conductive materials.

For example, the glass plate 110 may be a display protection glass plate or a car windshield glass plate, but it is not limited thereto. In alternative embodiments, the glass plate is a housing glass plate. Specifically, the glass plate 110 has a first surface E1 and a second surface E2 which are opposite to each other. The first radiation element 130, the second radiation element 140, the third radiation element 150, the fourth radiation element 160, and the feeding network 170 are all disposed on the first surface E1 of the glass plate 110. The ground element 120 is disposed on the second surface E2 of the glass plate 110.

The ground element 120 is coupled to a system ground plane (not shown) of the antenna array 100. In some embodiments, the ground element 120 is configured to cover the whole second surface E2 of the glass plate 110.

Each of the first radiation element 130, the second radiation element 140, the third radiation element 150, and the fourth radiation element 160 may substantially have a rectangular shape or a square shape. For example, the first radiation element 130, the second radiation element 140, the third radiation element 150, and the fourth radiation element 160 may be positioned at the four corners of a virtual rectangular shape or a virtual square shape, respectively, but they are not limited thereto. In some embodiments, the first radiation element 130, the second radiation element 140, the third radiation element 150, and the fourth radiation element 160 have vertical projections on the second surface E2 of the glass plate 110, and these vertical projections are completely inside the ground element 120.

The feeding network 170 has a feeding port FP1. The feeding port FP1 may be further coupled to a signal source (not shown). For example, the signal source may be an RF (Radio Frequency) module for exciting the antenna array 100. The feeding network 170 is coupled to the first radiation element 130, the second radiation element 140, the third radiation element 150, and the fourth radiation element 160. The shape and style of the feeding network 170 are not limited in the invention. In some embodiments, the feeding network 170 includes a first power splitter 171, a second power splitter 172, and a third power splitter 173.

Specifically, the first power splitter 171 has a common port P1, a first port P2, and a third port P3. The common port P1 of the first power splitter 171 is coupled to the feeding port FP1. The second power splitter 172 has a common port P4, a first port P5, and a second port P6. The common port P4 of the second power splitter 172 is coupled to the first port P2 of the first power splitter 171. The first port P5 of the second power splitter 172 is coupled to the first radiation element 130. The second port P6 of the second power splitter 172 is coupled to the second radiation element 140. The third power splitter 173 has a common port P7, a first port P8, and a second port P9. The common port P7 of the third power splitter 173 is coupled to the second port P3 of the first power splitter 171. The first port P8 of the third power splitter 173 is coupled to the third radiation element 150. The second port P9 of the third power splitter 173 is coupled to the fourth radiation element 160. In some embodiments, by using the feeding network 170, the RF energy of the signal source can be uniformly distributed to the first radiation element 130, the second radiation element 140, the third radiation element 150, and the fourth radiation element 160.

In some embodiments, if the glass plate 110 is a display protection glass plate, the ground element 120 can be disposed adjacent to a display device 180. It should be noted that the term “adjacent” or “close” over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

In some embodiments, the antenna array 100 covers an operational frequency band. The operational frequency band may be from 10 GHz to 40 GHz. Accordingly, the antenna array 100 can at least support the wideband operations of LEOS (Low Earth Orbit Satellite) or mmWave (Millimeter Wave) communications. According to practical measurements, the proposed antenna array 100 of the invention can provide relatively high radiation gain (especially for the radiation gain in the direction of +Z-axis).

In some embodiments, the element sizes of the antenna array 100 are described below. The thickness H1 of the glass plate 110 (or the distance between the first surface E1 and the second surface E2) may be from 0.5 mm to 5 mm. The length L1 of each of the first radiation element 130, the second radiation element 140, the third radiation element 150, and the fourth radiation element 160 may be from 0.5 to 1 wavelength (λ/2~1λ2) of the operational frequency band of the antenna array 100. The width W1 of each of the first radiation element 130, the second radiation element 140, the third radiation element 150, and the fourth radiation element 160 may be substantially equal to 0.5 wavelength (λ/2) of the operational frequency band of the antenna array 100. The center-to-center distance D1 or D2 between any two adjacent radiation elements of the first radiation element 130, the second radiation element 140, the third radiation element 150, and the fourth radiation element 160 may be from 0.5 to 1 wavelength (λ/2~1λ) of the operational frequency band of the antenna array 100. The above ranges of element sizes are calculated and obtained according to many experiment results, and they help to optimize the radiation gain, the operational bandwidth, and the impedance matching of the antenna array 100.

Figure 2A:
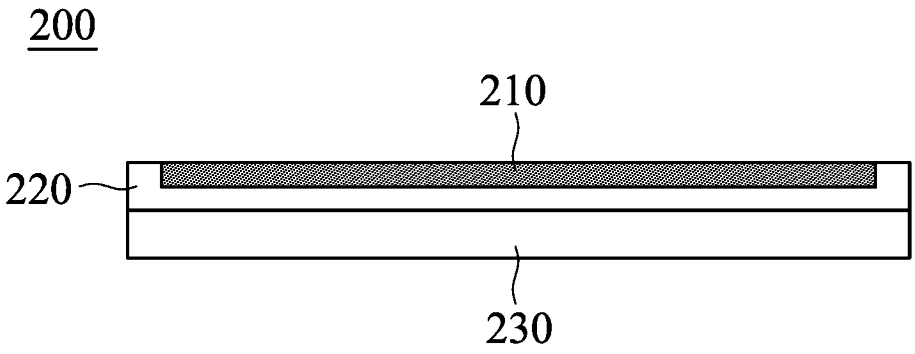
FIG. 2A is a side view of a transparent element according to an embodiment of the invention.
Figure 2B:
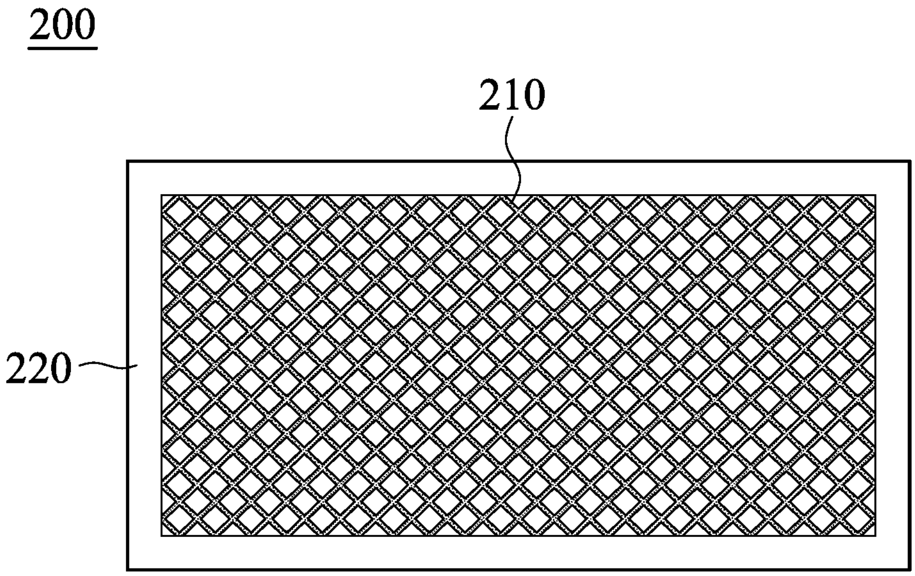
FIG. 2B is a top view of a transparent element according to an embodiment of the invention.

FIG. 2A is a side view of a transparent element 200 according to an embodiment of the invention. FIG. 2B is a top view of the transparent element 200 according to an embodiment of the invention. Please refer to FIG. 2A and FIG. 2B together. In some embodiments, each of the ground element 120, the first radiation element 130, the second radiation element 140, the third radiation element 150, the fourth radiation element 160, and the feeding network 170 is implemented with the transparent element 200. Specifically, the transparent element 200 includes a metal mesh layer 210, a transparent resin layer 220, and a transparent film layer 230. The metal mesh layer 210 is attached to the transparent film layer 230 by using the transparent resin layer 220. It should be noted that the width of each metal line of the metal mesh layer 210 is very small, and thus light can be easily transmitted through the metal mesh layer 210. Accordingly, it is also difficult for users to detect any visual obscuration even if the ground element 120, the first radiation element 130, the second radiation element 140, the third radiation element 150, the fourth radiation element 160, and the feeding network 170 are disposed adjacent to the display device 180. In other words, the proposed antenna array 100 of the invention can be almost considered as a completely transparent object, and it can be well integrated with relative devices.

Figure 3:
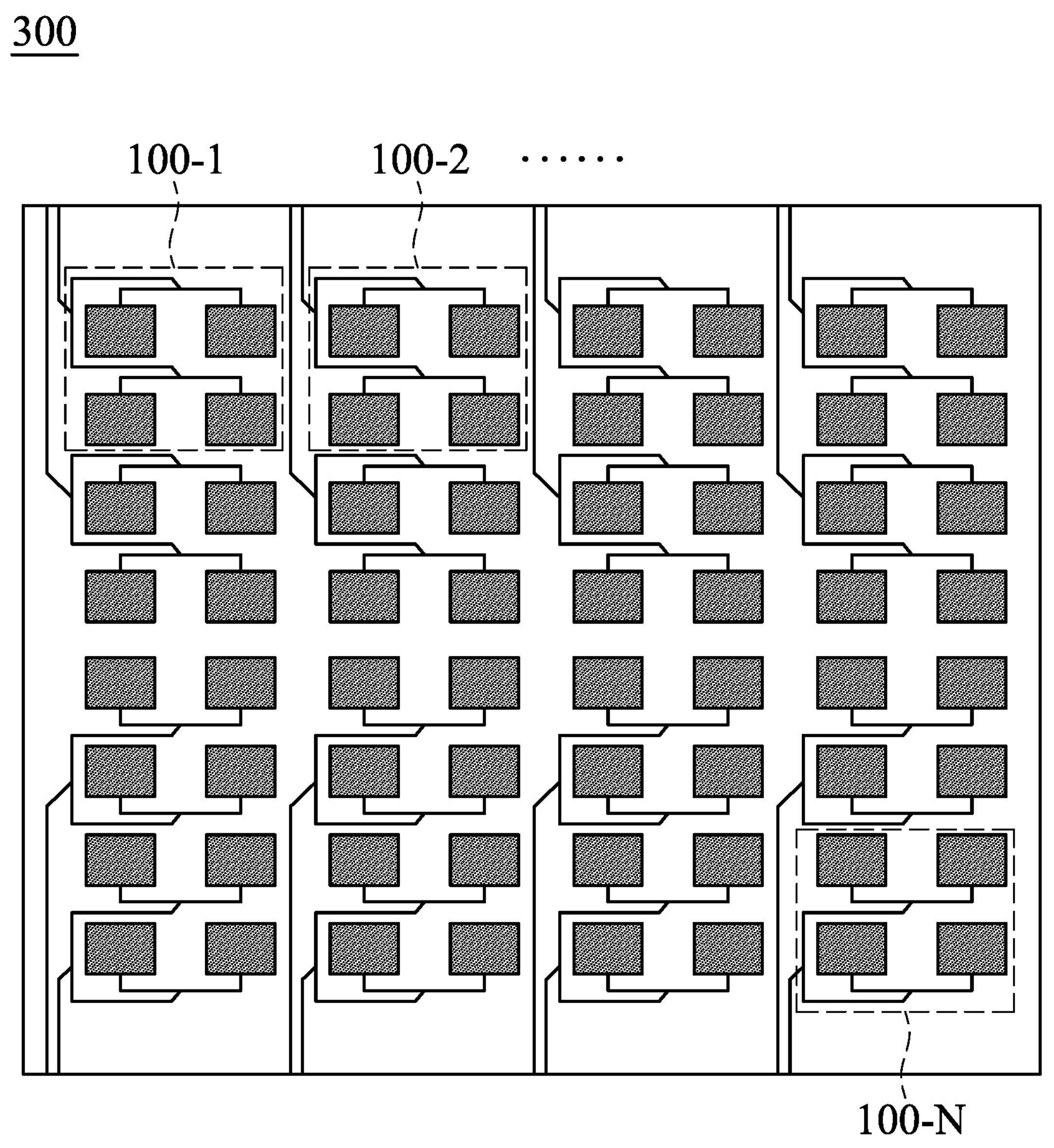
FIG. 3 is a top view of an antenna system according to an embodiment of the invention.

FIG. 3 is a top view of an antenna system 300 according to an embodiment of the invention. In the embodiment of FIG. 3, the antenna system 300 includes a plurality of antenna array 100-1, 100-2, . . . , and 100-N, and "N" may be any positive integer which is greater than or equal to 2, such as 16. Each of the antenna array 100-1, 100-2, . . . , and 100-N can be slightly adjusted based on the structure of the antenna array 100 of FIG. 1. According to practical measurements, the antenna system 300 can provide higher radiation gain than the single antenna array 100, and it can also support the beamforming function.

Figure 4A:
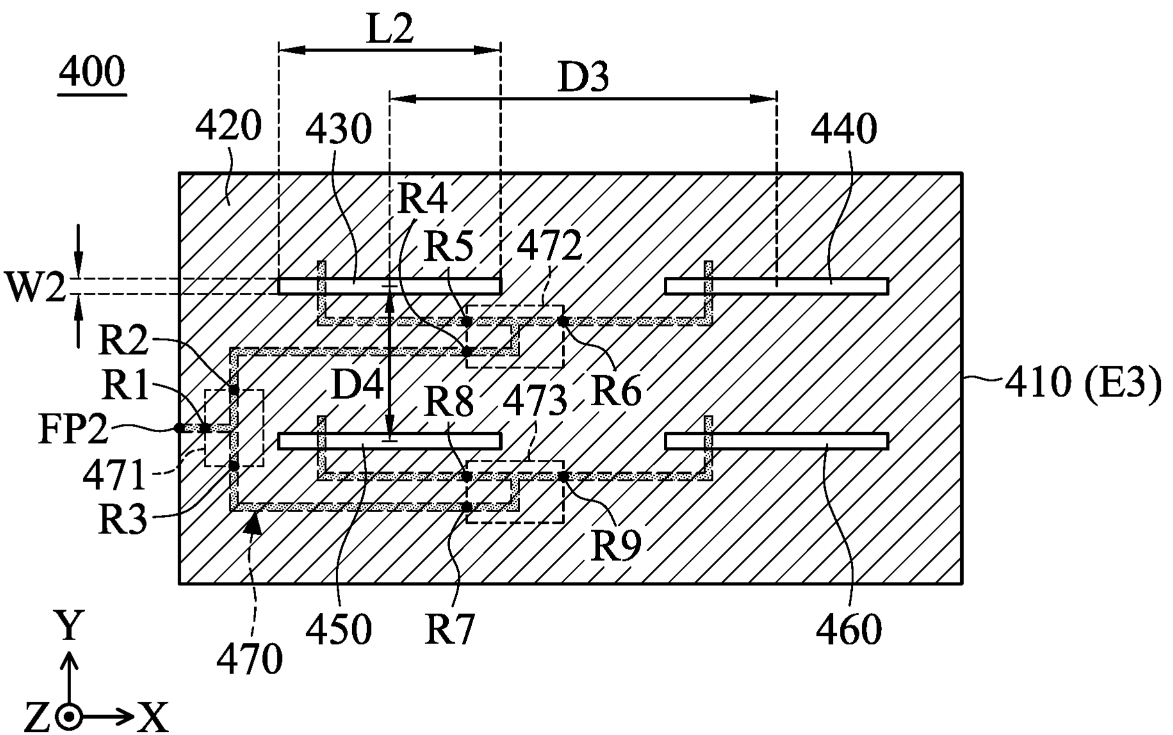
FIG. 4A is a top view of an antenna array according to another embodiment of the invention.
Figure 4B:
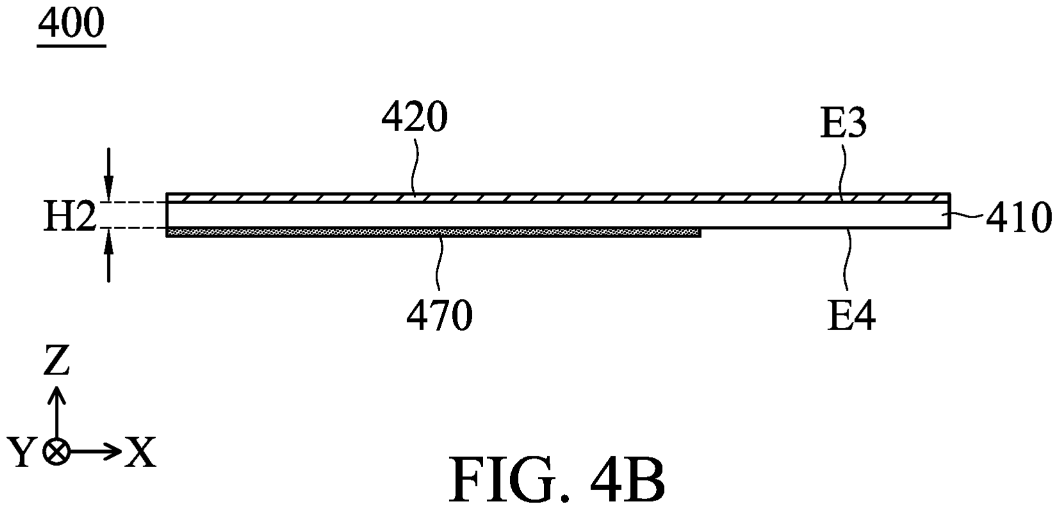
FIG. 4B is a side view of an antenna array according to another embodiment of the invention.

FIG. 4A is a top view of an antenna array 400 according to another embodiment of the invention. FIG. 4B is a side view of the antenna array 400 according to another embodiment of the invention. Please refer to FIG. 4A and FIG. 4B together. In the embodiment of FIG. 4A and FIG. 4B, the antenna array 400 at least includes a glass plate 410, a grounding radiation element 420, and a feeding network 470. The grounding radiation element 420 and the feeding network 470 may be made of conductive materials.

The glass plate 410 has a first surface E3 and a second surface E4 which are opposite to each other. The grounding radiation element 420 is disposed on the first surface E3 of the glass plate 410. The feeding network 470 is disposed on the second surface E4 of the glass plate 410.

It should be noted that a first slot 430, a second slot 440, a third slot 450, and a fourth slot 460 are formed in the grounding radiation element 420. Each of the first slot 430, the second slot 440, the third slot 450, and the fourth slot 460 may substantially have a straight-line shape. For example, the first slot 430, the second slot 440, the third slot 450, and the fourth slot 460 may be independent of each other, and they may be respectively positioned at the four corners of a virtual rectangular shape or a virtual square shape, but they are not limited thereto.

The feeding network 470 has a feeding port FP2. The feeding network 470 is adjacent to the first slot 430, the second slot 440, the third slot 450, and the fourth slot 460. The feeding port FP2 may be further coupled to a signal source (not shown). In some embodiments, the feeding network 470 has a vertical projection on the first surface E3 of the glass plate 410, and the vertical projection at least partially overlaps with each of the first slot 430, the second slot 440, the third slot 450, and the fourth slot 460. The shape and style of the feeding network 470 are not limited in the invention. In some embodiments, the feeding network 470 includes a first power splitter 471, a second power splitter 472, and a third power splitter 473.

Specifically, the first power splitter 471 has a common port R1, a first port R2, and a third port R3. The common port R1 of the first power splitter 471 is coupled to the feeding port FP2. The second power splitter 472 has a common port R4, a first port R5, and a second port R6. The common port R4 of the second power splitter 472 is coupled to the first port R2 of the first power splitter 471. The first port R5 of the second power splitter 472 is configured to excite the first slot 430. The second port R6 of the second power splitter 472 is configured to excite the second slot 440. The third power splitter 473 has a common port R7, a first port R8, and a second port R9. The common port R7 of the third power splitter 473 is coupled to the second port R3 of the first power splitter 471. The first port R8 of the third power splitter 473 is configured to excite the third slot 450. The second port R9 of the third power splitter 473 is configured to excite the fourth slot 460. In some embodiments, by using the feeding network 470, the RF energy of the signal source can be uniformly distributed to the first slot 430, the second slot 440, the third slot 450, and the fourth slot 460 of the grounding radiation element 420.

In some embodiments, the antenna array 400 covers an operational frequency band. The operational frequency band may be from 10 GHz to 40 GHz. Accordingly, the antenna array 400 can at least support the wideband operations of LEOS or mmWave communications. According to practical measurements, the proposed antenna array 400 of the invention can provide relatively high radiation gain (especially for the radiation gain in both the directions of +Z-axis and −Z-axis).

In some embodiments, the element sizes of the antenna array 400 are as follows. The thickness H2 of the glass plate 410 (or the distance between the first surface E3 and the second surface E4) may be from 0.5 mm to 5 mm. The length L2 of each of the first slot 430, the second slot 440, the third slot 450, and the fourth slot 460 may be substantially equal to 0.5 wavelength (λ/2) of the operational frequency band of the antenna array 400. The width W2 of each of the first slot 430, the second slot 440, the third slot 450, and the fourth slot 460 may be from 0.1 to 0.125 wavelength (λ/10~λ/8) of the operational frequency band of the antenna array 400. The center-to-center distance D3 or D4 between any two adjacent slots of the first slot 430, the second slot 440, the third slot 450, and the fourth slot 460 may be from 0.5 to 1 wavelength (λ/2~1λ) of the operational frequency band of the antenna array 400. The above ranges of element sizes are calculated and obtained according to many experiment results, and they help to optimize the radiation gain, the operational bandwidth, and the impedance matching of the antenna array 400.

In some embodiments, each of the grounding radiation element 420 and the feeding network 470 is implemented with the transparent element 200, whose structure has been described in the embodiment of FIG. 2A and FIG. 2B, and it will not be illustrated again herein. Similarly, the proposed antenna array 400 of the invention can be almost considered as a completely transparent object, and it can be well integrated with relative devices.

Figure 5:
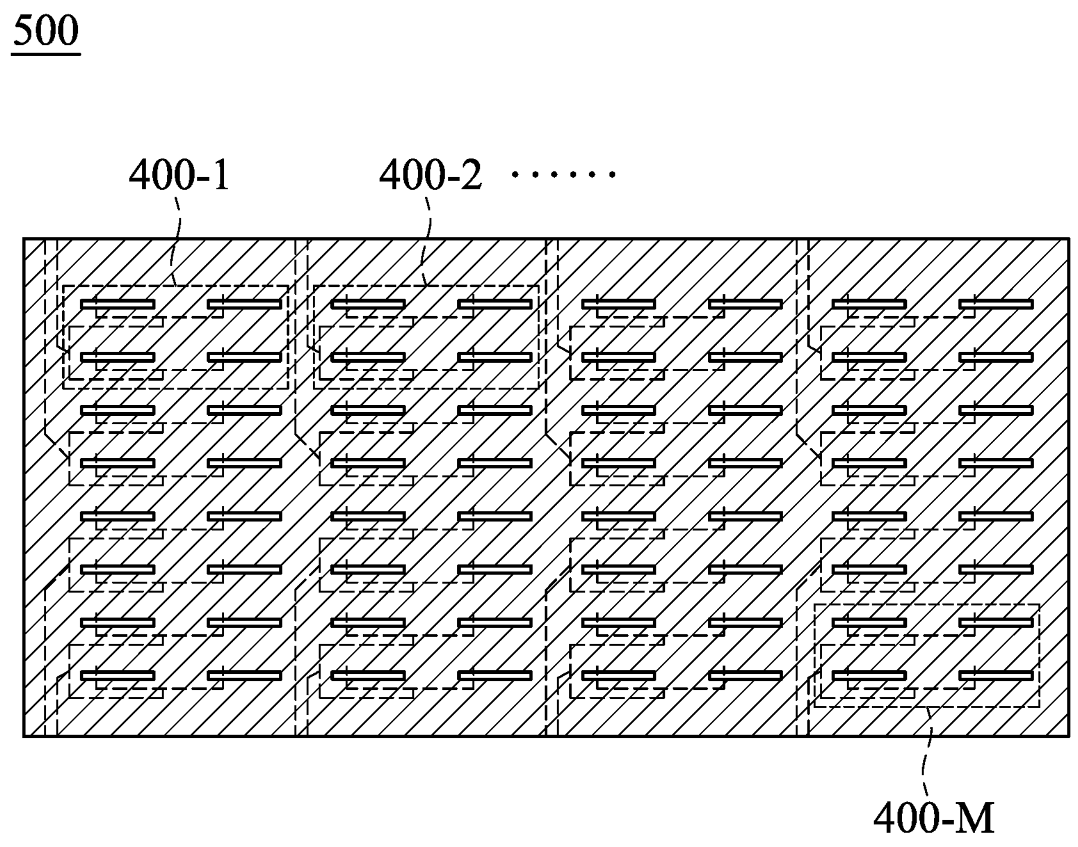
FIG. 5 is a top view of an antenna system according to another embodiment of the invention.

FIG. 5 is a top view of an antenna system 500 according to another embodiment of the invention. In the embodiment of FIG. 5, the antenna system 500 includes a plurality of antenna array 400-1, 400-2, . . . , and 400-M, and "M" may be any positive integer which is greater than or equal to 2, such as 16. Each of the antenna array 400-1, 400-2, . . . , and 400-M can be slightly adjusted based on the structure of the antenna array 400 of FIG. 4. According to practical measurements, the antenna system 500 can provide higher radiation gain than the single antenna array 400, and it can also support the beamforming function.

The invention proposes a novel antenna array. In comparison to the conventional design, the invention has at least the advantages of high radiation gain and wide operational bandwidth. Therefore, the invention is suitable for application in a variety of mobile communication devices or the IOT.

Note that the above element sizes, element shapes, and frequency ranges are not limitations of the invention. An antenna designer can fine-tune these settings or values, depending on requirements. It should be understood that the antenna array of the invention is not limited to the configurations of FIGS. 1 to 5. The invention may merely include any one or more features of any one or more embodiments of FIGS. 1 to 5. In other words, not all of the features displayed in the figures should be implemented in the antenna array of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna array, comprising:
- a glass plate, having a first surface and a second surface opposite to each other;
- a ground element, disposed on the second surface of the glass plate;
- a first radiation element;
- a second radiation element;
- a third radiation element;
- a fourth radiation element; and
- a feeding network, having a feeding port, wherein the feeding network is coupled to the first radiation element, the second radiation element, the third radiation element, and the fourth radiation element;
- wherein the first radiation element, the second radiation element, the third radiation element, the fourth radiation element, and the feeding network are disposed on the first surface of the glass plate;
- wherein each of the ground element, the first radiation element, the second radiation element, the third radiation element, the fourth radiation element, and the feeding network is implemented with a transparent element, and wherein the transparent element comprises a metal mesh layer, a transparent resin layer, and a transparent film layer.

2. The antenna array as claimed in claim 1, wherein the antenna array covers an operational frequency band, and the operational frequency band is from 10 GHz to 40 GHz.

3. The antenna array as claimed in claim 2, wherein a width of each of the first radiation element, the second radiation element, the third radiation element, and the fourth radiation element is substantially equal to 0.5 wavelength of the operational frequency band.

4. The antenna array as claimed in claim 2, wherein a center-to-center distance between any two adjacent radiation elements of the first radiation element, the second radiation element, the third radiation element, and the fourth radiation element is from 0.5 to 1 wavelength of the operational frequency band.

5. An antenna array, comprising:
- a glass plate, having a first surface and a second surface opposite to each other;
- a grounding radiation element, disposed on the first surface of the glass plate, wherein a first slot, a second slot, a third slot, and a fourth slot are formed in the grounding radiation element; and
- a feeding network, having a feeding port, wherein the feeding network is adjacent to the first slot, the second slot, the third slot, and the fourth slot;
- wherein the feeding network is disposed on the second surface of the glass plate;
- wherein each of the grounding radiation element and the feeding network is implemented with a transparent element, and wherein the transparent element comprises a metal mesh layer, a transparent resin layer, and a transparent film layer.

6. The antenna array as claimed in claim 5, wherein the antenna array covers an operational frequency band, and the operational frequency band is from 10 GHz to 40 GHz.

7. The antenna array as claimed in claim 6, wherein a length of each of the first slot, the second slot, the third slot, and the fourth slot is substantially equal to 0.5 wavelength of the operational frequency band.

8. The antenna array as claimed in claim 6, wherein a center-to-center distance between any two adjacent slots of the first slot, the second slot, the third slot, and the fourth slot is from 0.5 to 1 wavelength of the operational frequency band.

* * * * *